3,046,308
Patented July 24, 1962

3,046,308
O-ALLYL-N,N-DIALLYLHYDROXYLAMINE AND METHOD OF PREPARATION
Jesse T. Dunn, Charleston, and Donald L. Heywood, South Charleston, W. Va., assignors to Union Carbide Corporation, a corporation of New York
No Drawing. Filed Oct. 16, 1958, Ser. No. 767,518
5 Claims. (Cl. 260—584)

This invention relates in general to a new and useful trisubstituted hydroxylamine and more particularly to O-allyl-N,N-diallylhydroxylamine and method of preparation.

Preparations of the oxides of tertiary amines by oxidizing the amine with peroxides, peracids and the like are well known processes. In such reactions the amines readily undergo oxidation with an initial attack on the nitrogen atom. Among the amines, the case of the tertiary aliphatic amines is the most significant and the simplest, for these compounds are oxidized smoothly by hydrogen peroxide to amine oxides of the general formula $R_3NO$ or the hydrates $R_3N(OH)_2$, where R represents an aliphatic group. For example, by the oxidation of trimethylamine with aqueous hydrogen peroxide the hydrate $(CH_3)_3N(OH)_2 \cdot H_2O$ is obtained which when heated in vacuum dehydrates to the anhydrous trimethylamine oxide. Upon further heating, certain amine oxides will rearrange to the corresponding hydroxylamine. Thus, substituted hydroxylamines such as O-allyl-N,N-dialkylhydroxylamines and O-benzyl-N,N-dimethylhydroxylamines have been described in the literature wherein the corresponding allylicdialkylamine and benzyldimethylamine were converted to the oxides by treatment with hydrogen peroxide, and the resulting oxide rearranged to the hydroxylamine by heating under reduced pressure.

Heretofore, rearrangements of the type described above have been confined to those trisubstituted amine oxides containing only one unsaturated function. It is therefore an object of the present invention to provide a new composition of matter, O-allyl-N,N-diallylhydroxylamine, wherein the molecule contains three unsaturated groups. Another object of the present invention is to provide a new composition of matter which can be easily prepared from commercially available starting materials. A further object of the present invention is to provide a process for the preparation of O-allyl-N,N-diallylhydroxylamine. Other objects and a fuller understanding of the present invention will be had by referring to the following detailed description.

Briefly stated, the present invention relates to a new composition of matter and more particularly to a hydroxylamine containing three unsaturated functions in the same molecule and to a method of its preparation. O-allyl-N,N-diallylhydroxylamine, the compound of this invention, is a trifunctional monomer and differs from the mono-allylichydroxylamines of the literature in that resins prepared from these triallylichydroxylamines can be cross-linked. Thus copolymers prepared from O-allyl-N,N-diallylhydroxylamine are useful as oil additives or other applications in which it is desirable to incorporate into the polymer a polar, water-solubilizing group containing a basic function.

In accordance with the practice of the present invention O-allyl-N,N-diallylhydroxylamine can be prepared from triallylamine by oxidation with peracetic acid, hydrogen peroxide and the like. Upon oxidation the amine oxide is formed as an intermediate which rearranges either on gentle heating or standing for a few days in a desiccator at room temperature. The oxidation and rearrangement is illustrated by the following equations:

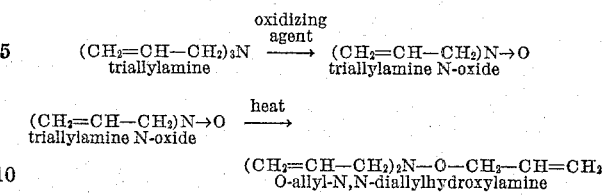

In a preferred embodiment of this invention the triallylamine is oxidized with 30 percent hydrogen peroxide at a temperature of from about 0° C. to about 70° C. and more preferably 25° C. to 60° C. While hydrogen peroxide is a preferred oxidant, other oxidizing agents such as peracetic acid, perbenzoic acid, organic peroxides, organic hydroperoxides, and the like can be employed. A preferred range of molar ratios of oxidant to triallylamine is from about 0.8 to about 1.5. Oxidation is allowed to proceed for a time sufficient to consume at least 80 percent of the theoretical peroxide. After decomposition of any unreacted peroxide the solution is concentrated and dried in vacuum to give the crude triallylamine N-oxide. Rearrangement of the intermediate triallylamine N-oxide can be effected by heating at temperatures of from about 30° C. to about 100° C. for a period of from about 0.5 to 5 hours. While these are preferred temperatures for drying and rearranging, temperatures above 100° C. and below 30° C. can also be employed. Rearrangement and isolation can be accomplished in a one step operation by extraction, co-distillation with water, or fractionation, or a combination of these techniques.

Triallylamine, the starting material of this invention, can be prepared by methods known to the art. For example, by reacting allyl chloride with ammonia, the triallylamine can be obtained in good yields.

The following examples are given to illustrate the best mode presently contemplated for the preparation of O-allyl-N,N-diallylhydroxylamine:

EXAMPLE I 274 grams (2.0 moles) of triallylamine was oxidized with a 50 percent excess of peracetic acid in ethyl acetate solvent at 0° C.–5° C. The crude reaction mixture was poured into an excess of aqueous alkali whereupon the organic layer was separated and the aqueous layer steam distilled. Extraction of the steam distillate with ether followed by fractionation of the ether extract gave 182 gram (1.19 moles) of O-allyl-N,N-diallylhydroxylamine in 59 percent yield and having the following analysis: boiling point 80–80.5° C. at a pressure of 50 millimeters of mercury; $n$ 30/D=1.4400; calculated for $C_9H_{15}ON$: amine equivalent, 153; molecular weight 153; percent C, 70.55; percent H, 9.87; found: amine equivalent, 154; molecular weight, 151; percent C, 70.3; percent H, 10.1.

EXAMPLE II 68.5 grams (0.5 mole) of triallylamine was oxidized with 0.5 mole of 30 percent hydrogen peroxide for seven days at 50° C. at which time 80 percent of the theoretical peroxide was consumed. After decomposition of unreacted peroxide with cobalt Nuodex, the solution was concentrated and dried in vacuum to give 55 grams (0.38 mole) of crude triallylamine N-oxide as a viscous, non-volatile, water-soluble residue in 76 percent yield. A portion of this product was rearranged by heating for one hour at 70° C. to give O-allyl N,N-diallylhydroxylamine in 88 percent yield. The remainder of N-oxide rearranged spontaneously to the O-allyl N,N-diallylhydroxylamine upon standing in a vacuum desiccator for two days. The O-allyl N,N-diallylhydroxylamine had properties identical to those in the above-described experiment: boiling point 80–85.5° C. at a pressure of 50 millimeters of mercury; $n\ 30/D=1.4400$. The infrared spectra of the products from both experiments were identical.

EXAMPLE III

Copolymerization of O-Allyl-N,N-Diallylhydroxylamine With Vinylidene Chloride

To a Pyrex tube was charged 7.0 grams vinylidene chloride, 3.0 grams O-allyl-N,N-diallylhydroxylamine and 0.1 gram azo-bis-isobutyronitrile. The tube was purged with nitrogen, sealed and rocked in a water bath at 50° C. 201 hours. The recovered resin weighed 1.3 grams (13 percent conversion) and analyzed 82.8 percent vinylidene chloride. The copolymer had a reduced viscosity in cyclohexanone of 0.098.

EXAMPLE IV

Copolymerization of O-Allyl-N,N-Diallylhydroxylamine With Vinyl Chloride

To a pyrex tube was charged 8.0 grams vinyl chloride, 2.0 grams O-allyl-N,N-diallylhydroxylamine and 0.1 gram azo-bis-isobutyronitrile. The tube was purged with nitrogen, sealed and rocked in a water bath at 50° C. for 284.25 hours. The recovered polymer weighed 0.67 gram (6.7 percent conversion) and analyzed 73 percent vinyl chloride.

The foregoing detailed description has been given for clearness of understanding of the present invention and no unnecessary limitations are to be understood therefrom except as such limitations appear in the claims.

What is claimed is:

1. A composition of matter, O-allyl N,N-diallylhydroxylamine.

2. A process for preparing O-allyl N,N-diallylhydroxylamine which comprises oxidizing triallylamine with an amine oxidizing agent selected from the group consisting of hydrogen peroxide and peracetic acid to produce triallylamine N-oxide, and heating said triallylamine N-oxide at a temperature of from about 30° C. to about 100° C. to form O-allyl N,N-diallylhydroxylamine.

3. A process for preparing O-allyl N,N-diallylhydroxylamine which comprises oxidizing triallylamine with at least a molar equivalent of an amine oxidizing agent selected from the group consisting of hydrogen peroxide and peracetic acid to produce triallylamine N-oxide, and heating said triallylamine N-oxide at a temperature of from about 30° C. to about 100° C. for a period of from about 0.5 hour to about 5 hours to form O-allyl N,N-diallylhydroxylamine.

4. A process as claimed in claim 3 wherein the amine oxidizing agent is hydrogen peroxide.

5. A process as claimed in claim 3 wherein the amine oxidizing agent is peracetic acid.

References Cited in the file of this patent
UNITED STATES PATENTS

| | | |
|---|---|---|
| 2,456,428 | Parker | Dec. 14, 1948 |
| 2,871,229 | Price | Jan. 27, 1959 |

OTHER REFERENCES

Kleinschmidt et al.: Journal American Chemical Society, volume 66, pp. 1929–1933 (1944). (Copy available U.S. Patent Office Scientific Library.)